United States Patent [19]
Bucolo

[11] Patent Number: 5,471,272
[45] Date of Patent: Nov. 28, 1995

[54] ACCESSORY USEFUL FOR CAMERA HAVING NO REMOTE OPERATION CAPABILITY

[76] Inventor: Sebastian Bucolo, 45 Dolphin St., Revere, Mass. 02151

[21] Appl. No.: 857,269

[22] Filed: Mar. 25, 1992

[51] Int. Cl.⁶ ................................................. G03B 17/38
[52] U.S. Cl. ........................................................ 354/269
[58] Field of Search ........................... 354/269; 352/179, 352/178

[56] References Cited

U.S. PATENT DOCUMENTS

| | | | |
|---|---|---|---|
| 2,769,186 | 5/1954 | Schulte | 352/179 |
| 4,453,815 | 6/1984 | Kain | 354/269 |
| 4,794,414 | 12/1988 | Kozina et al. | 354/269 |
| 5,160,955 | 11/1992 | Nihls et al. | 354/269 |

*Primary Examiner*—Monroe H. Hayes
*Attorney, Agent, or Firm*—Herbert L. Gatewood

[57] ABSTRACT

An accessory for a photographic camera having no built-in capability for remote operation of the operating or shutter button of the camera.

16 Claims, 3 Drawing Sheets

ACCESSORY USEFUL FOR CAMERA HAVING NO REMOTE OPERATION CAPABILITY

BACKGROUND OF THE INVENTION (1) Field of the Invention

This invention relates, in general, to an accessory for a photographic camera. More particularly it relates to an accessory or device for use in combination with a camera for allowing remote operation of the operating or shutter button of a camera.

(2) Description of the Prior Art

Oftentimes it is desirable to include one's self in a group photograph. At other times, it may be desirable, for one reason or another, to take a self photograph, e.g., to provide a photograph to a friend or family member. This is easily accomplished with some cameras due to the fact that such a camera has a built-in timing mechanism, providing a delay in operation of the camera shutter. This allows a person who desires to be included in a photograph to get into position before the camera shutter opens and the camera "takes the picture." Other cameras, in some cases at least, have means for connection of a remote control means, i.e., a shutter release cable or cord for triggering the operation of the camera from a remote location, or at least off the camera, either mechanically or electronically.

The above features, i.e., self-timer and remote capability, are found generally in relatively more expensive cameras, i.e., ones costing several hundreds of dollars. In fact, some cameras have both features built into the camera, i.e., the camera is provided with self-timer means and means for connection of a cord to the camera for remote operation. This cord may be short, e.g., 18 inches or so or much longer, e.g., several feet. Such a shorter cord is useful in operation of the camera mounted on a tripod without having to touch the camera itself, possibly resulting in some camera movement and a lesser sharp image. The longer cords are useful in taking photographs of, for example, animals or birds, without being observed by such a subject. Nevertheless, neither the self-timing feature nor the ability to operate the camera from a remote location are found in the relatively cheap cameras of which I am aware, particularly those cameras costing less than about $100.00. These capabilities, nevertheless, are often desired by those owners of the less expensive cameras. Thus, a need exists to provide these additional functions to any camera if such is lacking, regardless of the camera's cost.

SUMMARY OF THE INVENTION

It is a primary object of the invention to provide a removable framework for a camera for attachment of remote operating means for the camera's operating button.

It Is a further object of the invention to provide a camera with the capability of performing the function of a self-timer permitting a person to include him or herself in a photograph, or merely to take a photograph of one's self.

It is still a further object of the invention to provide a camera with the capability for providing activation of the camera's operating or shutter button or the like of the camera or from a location remote from the camera.

Another object of the invention is to provide a relatively simple accessory or device for use in combination with a camera that has neither a self-timer for operation of the camera's operating button or the like nor means for remote operation of the operating button that, when provided in operative association with the camera, can provide for either of such functions, as desired.

A still further object of the invention is to provide a camera accessory of relatively simple construction that, when provided in operative association with the camera, allows a person to take a self photo or to be included in a group photo, or to operate a camera from a location off or remote from the camera's location.

Quite advantageously, the camera accessory provided by this invention allows a photographer having a camera not having remote capabilities to take a photograph of a bird or other animal in an unobtrusive manner and without being seen.

A further advantage is to provide a camera accessory that allows a photographer to mount a camera not having remote capability on to a tripod and to activate its shutter button off camera, allowing for a sharper image in the photograph taken.

The above and other objects of the invention, as will be more readily appreciated from a reading of this disclosure of the invention, are accomplished by a camera accessory or device which comprises, in its most basic aspects, a frame means or member for operative association with a camera, the frame member being defined by top and bottom members parallel to one another of predetermined length and by parallel side walls defined by top and bottom ends connected to the ends of the top and bottom members whereby to form a frame for enclosing a camera, said frame being provided with threaded openings for attachment to the the frame of means for mechanical activation of the camera's operating or shutter-release button and, if desired, a tripod.

BRIEF DESCRIPTION OF THE DRAWINGS

Although such novel features believed to be characteristic of the invention disclosed herein are set forth in the claims appended hereto, the invention and the manner in which it may be carried out may be further understood by reference to the detailed description which follows hereinafter in connection with the accompanying drawings, in which:

DETAILED DESCRIPTION OF THE INVENTION AND THE PREFERRED EMBODIMENTS THEREOF

Figure 1:
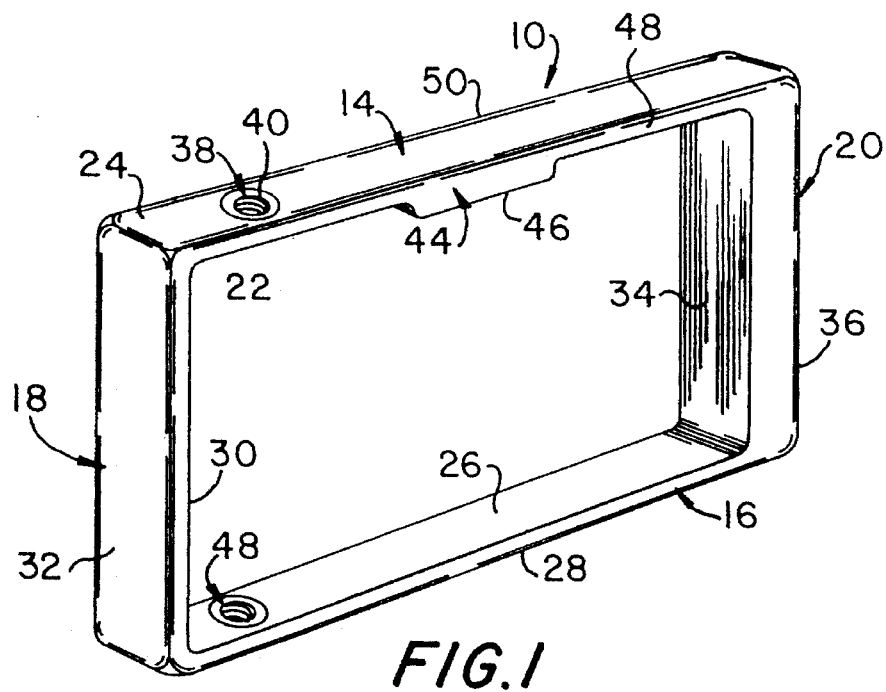
FIG. 1 is a perspective view of an accessory frame member according to the invention for association with a camera having a somewhat rectangular shape, showing the openings for attachment of the activation end of a remote operating means for activation of the shutter or operating button of the camera means and for connection of the frame member to a conventional tripod, if desired.

Referring now to FIG. 1 of the drawing there is shown therein an accessory means or device for a camera comprising a frame member 10 in accordance with one aspect of the invention. The frame member 10 defines a rectangular-shaped member which comprises spaced-apart top and bottom elongated members 14 and 16 of predetermined length parallel to one another, and parallel spaced-apart elongated side walls 18, 20 of a lesser predetermined length. The top and bottom members 14, 16 are connected at their ends to the respective upper and lower ends of the side walls 18, 20, as will be appreciated from the drawing. The means for connection of these ends together will depend somewhat upon the particular material of construction of the frame member; however, such can be accomplished by various conventional fastening means well-known to those skilled in the art, e.g., screw-type fasteners, staple-like members, or adhesive compositions. If the frame member 10 is of a plastic composition, it can be molded of unitary construction, as shown in the drawings.

As shown in FIG. 1, the top and bottom members 14, 16 and side walls 18, 20 are provided with inner and outer surfaces 22, 24, 26, 28, 30, 32, and 34, 36, respectively. These inner and outer surfaces are preferably planar and parallel to one another. Nevertheless, it may be desirable with some materials of construction to provide surfaces having a slight degree of roughness, as such may provide a better friction fit between the camera and frame member, as will be more readily appreciated hereinafter.

In top member 14, there is provided an elongated opening 38 in which is fixedly secured member 40 provided with an internal elongated thread pattern 42, the reason for which will soon become clear, if not already. This opening 42 extends inwardly from the outer surface 24 of top member 14 and its length is determined by inner surface 22. Midway between the ends of top member 14 there is optionally provided an inwardly protruding member 44 whose purpose will later be more fully disclosed. The inwardly protruding member 44 is defined by a horizontally disposed planar bottom face 46 parallel to the horizontally disposed planar inner and outer surfaces of top member 14.

In the elongated bottom member 16 of the frame member 10, as best seen in FIG. 1, there is provided an elongated opening 48 the ends of which are shown to be determined by the inner and outer surfaces 26, 28. Nevertheless, opening 48 need not terminate at these surfaces, depending somewhat upon the thickness of the bottom member 16. As shown by FIG. 1 of the drawing, the top and bottom members and side walls can be of the same thickness, if desired. The bottom member 16 can, if desired, be of greater thickness than the top member 14 and side walls. The thickness of the top and bottom members and sidewalls will depend somewhat upon the material of construction. These members should be relatively stiff but of sufficient flexibility to slide a camera into the opening defined thereby, as is readily shown in FIG. 3. The width of the top and bottom members and sides can vary somewhat and, if desired, even be of different width. This may also be determined to a certain extent by the material of construction, keeping in mind the desired stiffness characteristics. The width of the frame members, i.e., from front edge 48 to back edge 50, of top member 14 can be generally from about ½" to 1", preferably about ⅝", depending somewhat upon the particular camera being enclosed. The width should just be enough to do the job, i.e., provide a good fit with the camera. Also, it will be appreciated that the front and back edges of the top members and side walls need not be parallel They can be, for example, bowed outwardly if desired. Such is believed not generally necessary, however, and merely a waste of material.

Elongated opening 48, as shown in FIG. 1, is provided with an internal thread pattern suitable for connection of frame member 10 to a conventional elongated tripod fitting having a usual external thread pattern. Preferably the threaded opening will be provided by a conventional bushing fixedly secured in an opening in the bottom member, as seen in FIG. 1. As earlier disclosed, the elongated opening 48 need not extend through the bottom member 16. If the bottom member is of sufficient thickness, the elongated opening 48 can extend inwardly from bottom surface 28 and in perpendicular disposition thereto, stopping short of inner bottom surface 26. A dead bore bushing with an internal thread pattern can be used for such purpose. The main thing is that the elongated opening 48 be of sufficient depth to allow at least 2–3 turns of the elongated threaded fitting 50 on the tripod. See FIG. 3. Otherwise, the camera frame 10 may not be securely connected to the tripod. The opening 48, if extending all the way through the bottom member, should be of sufficient depth, however, that the tripod threaded fitting 50 need not be in contact with the camera body whereby damage to, or at least marring of, the camera's body surface could occur.

In operative combination with frame member 10 there is provided a commercially available means 52 for operation of a camera's operating or shutter button 66 from off the camera or from a more remote location, as later more fully described. The remote cable release means comprises, as will be seen by reference to FIG. 2, an elongated tubular member 54 having inner end 56 and an outer end respectively. At the inner end 56 there is provided a plunger means 60 having a planar circular-shaped face 62 located directly against and in sealing contact with the upper surface 24 of the top member 14 of the frame member. Protruding downwardly from face 62 and centrally disposed therein is an elongated member having an external thread pattern complementary to internal thread pattern 42 in the frame member. Thus, the remote means 52 can be securely connected to the frame member. Although not shown, member 64 can be provided with a suitable lock washer and nut on its free end, as conventionally done, to make certain the remote means does not become unintentionally loosened on the frame member 10. The length of the elongated threaded member 64 can vary somewhat; however, it should stop short of the operating button 66 of the camera 68, as will be seen by reference to FIG. 2.

Centrally disposed in elongated member 64 is an elongated circular-shaped opening 70 which extends the length of the threaded member 64 and provides a passageway for the elongated, circular-shaped plunger 72. The plunger has a top end to which is fixedly secured a circular-shaped disc-like member 74, the bottom or front end of the plunger 72 being, as shown in the drawing, in touching contact with the top surface of the operating bottom 66. Nevertheless, when in its inoperative position, the plunger or elongated rod 72 will be withdrawn to a greater extent and out of contact with the operating button.

Figure 2:
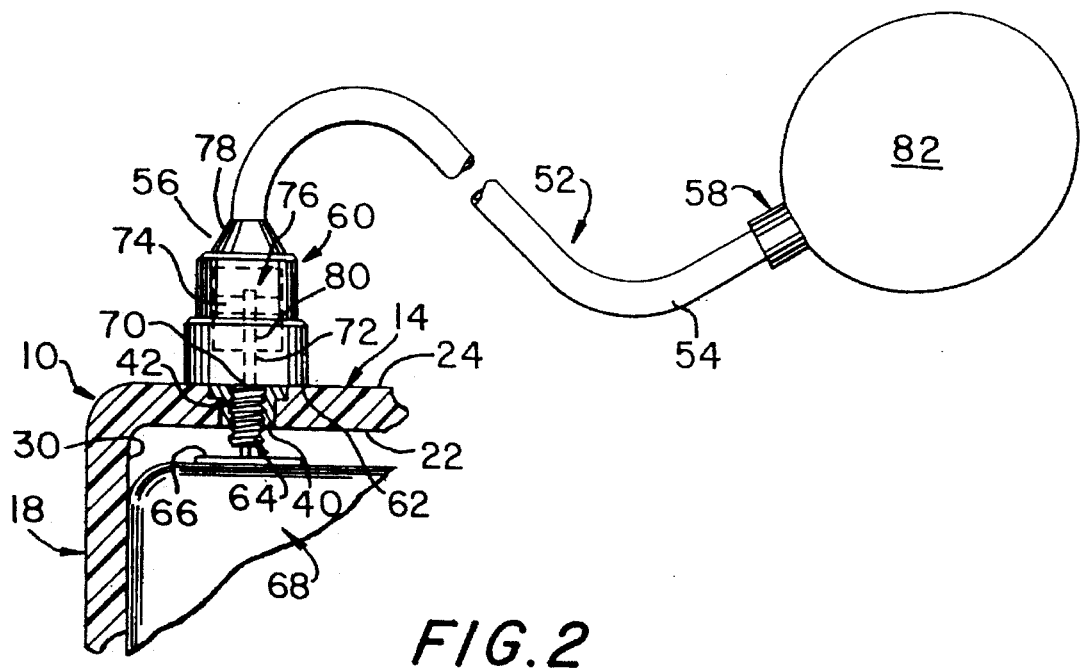
FIG. 2 is a partial view in section of a portion of the frame member shown in FIG. 1, showing the plunger member of the remote operating means in operative combination with the frame member.

As shown FIG. 2, the plunger 72 is in position to operate the shutter button with application of a force thereto. The disc-like member 74 is caused to ride up and down in the sealed circular-shaped enclosure 76, as later more fully disclosed, causing, in turn, the elongated plunger or needle 72 to reciprocate in a back and forth direction in passageway 70. The circular-shaped enclosure is provided with openings 78, 80, the purpose for which will soon be made clear. The circular-shaped opening 70 should just be of sufficient diameter to allow the plunger needle or rod 72 to freely reciprocate up and down therein. Nevertheless, it should be of a sufficient diameter greater than plunger 72 as to allow the escape of air from the bottom of enclosure 76. The diameter of disc-like member 74 should be of sufficient diameter relative to the diameter of the enclosure 76 to provide a relatively good seal against the escape of air but not of too great a diameter as not to allow free up and down movement of the disc-like member 74.

At the other, i.e., the outer, end of the elongated tubular-member 54, there is provided a compressible, spherical-shaped bulb 82 of conventional manner for pumping air into and through tube 54. Thus on squeezing bulb 82 air is caused to travel through the tube 54 toward its inner end 56 and out opening 78 into the enclosure 76. As the top of enclosure 76 is sealed by disc-member 74 the force of the air causes the disc-member 74 to move downwardly toward the bottom of the enclosure. This, in turn, of course, causes the plunger 72 to move downwardly, contacting the operating button 66. As will be readily appreciated by those in the art, the relative height of enclosure 76 and the elongated plunger must be such that the bottom end of the plunger 72 not merely contacts the operating button 66 but causes it to, in turn, be compressed and operated in normal fashion, just as if one were pressing the operating button 66 with a finger.

The shutter button 66 will, of course, stay depressed until the air is released from tube 54. Although not shown, the tube 54 can be provided with a valve member allowing air to be bled off releasing the force against the disc-like member 74. On releasing of the air pressure, the needle reciprocates to its backward or rest position, allowing operating button 66 to also be released. In its rest position, the top surface of the disc-like member 74 will be, preferably, in contact with the top surface of the enclosure 76. This will help ensure the bottom end of the plunger 72 is free of the operating button 66. In some cases, it may be desirable to provide a coiled spring (not shown) in the bottom part of the enclosure 76, to make certain that the plunger 72 is withdrawn to the extent desired. The ends of such a spring will be located against the bottom surface of the enclosure and the bottom surface of the disc-like member 72. Thus, on downward movement of the plunger, the spring will be compressed, that stored energy being released when air is released from the tube 54. The force from the spring expanding will cause the plunger to reciprocate to the desired position, the top surface of the disc-like member 74 being again positioned against the top surface of the enclosure.

Instead of a remote device operated by air, as earlier disclosed, the remote device can comprise an elongated sheath or tubular member, like tubular member 54, in which is provided an elongated rod-like plunger member, about the same diameter as pencil lead. The plunger member, in this case, is of a predetermined length longer than the sheath-like member and is determined by an inner end and an outer end. The elongated rod-like plunger member is movable reciprocally lengthwise of the sheath-like member, a predetermined distance, as later more fully disclosed. Fixedly attached to the inner end of the sheath-like member is an adapter similar to that disclosed in FIG. 2 having a planar bottom surface for location against the planar outer surface 24 of the top member 14. Located in the top member 14 of the frame, and fixedly secured therein is an elongated bushing having a centrally disposed elongated passageway having an internal thread pattern. This bushing is located directly below and in alignment with the elongated plunger or rod. Thus, in this case when the outer end of the plunger rod is pushed inwardly into the tube, the inner end thereof will make contact with and cause the shutter button to operate as before disclosed. The outer end of the plunger rod can be provided with a disk-shaped member in lateral disposition to the length of the rod in which a photographer's thumb can be readily placed. The outer end can be provided with a set screw or the like the outer end of which can be screwed in against the plunger, if desired, to maintain it in a certain position relative to the sheath containing it. The plunger rod should be sufficiently enough longer than the tube so that when the outer end of the plunger rod is pushed inwardly, the inner end of the rod will clear the end of the inner surface of the top member 14 of the frame containing it so as to contact the operating button and cause it to be compressed and operated in usual manner.

Figure 3:
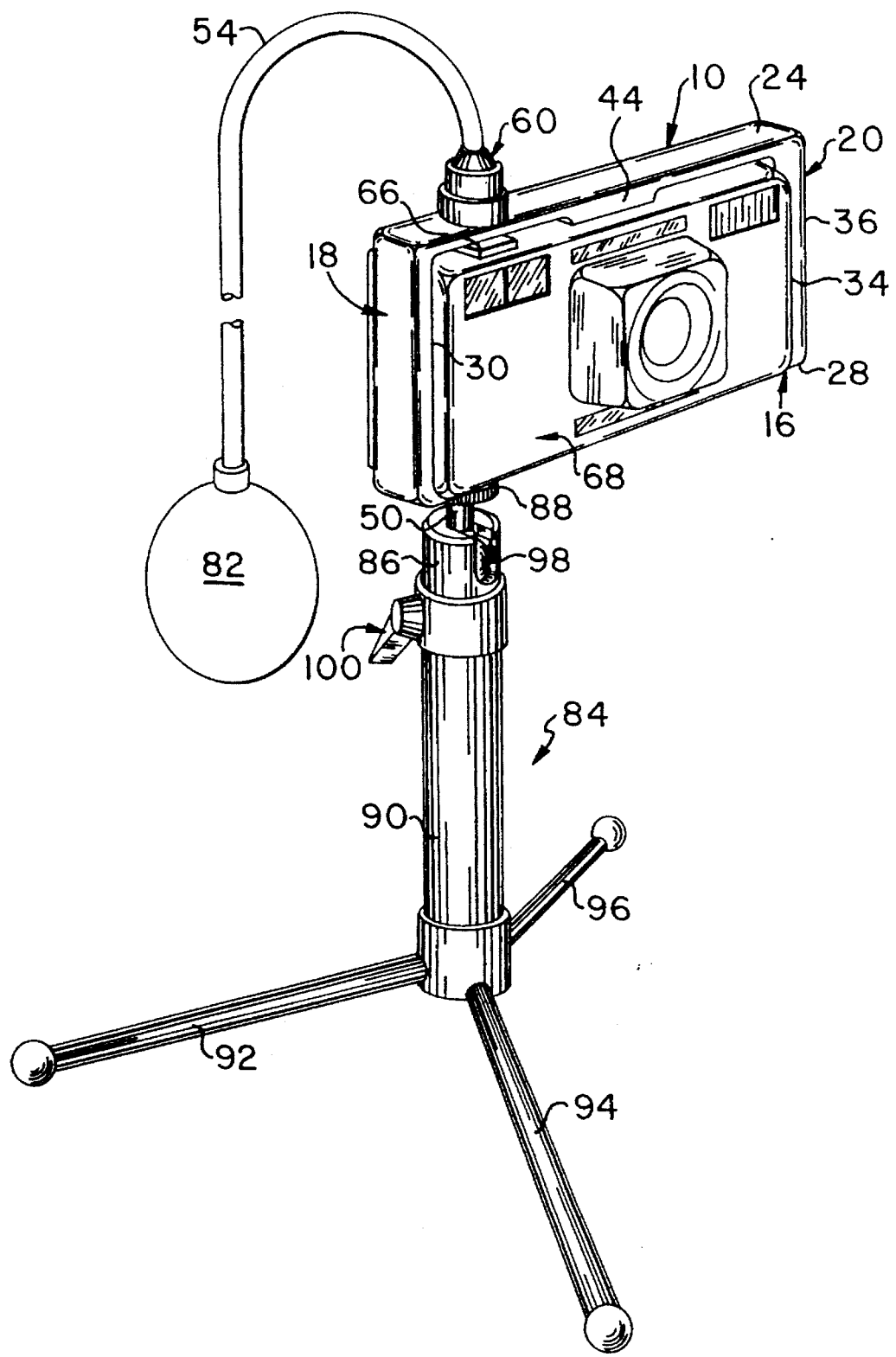
FIG. 3 is a view in perspective showing a typical 35 mm, relatively cheap, point-and-shoot camera located within and enclosed by the frame member of an accessory means of the invention such as shown in FIGS. 1 and 2 and showing the remote means for activation of the camera shutter button in combination with the frame member and the frame member being in combination with a conventional mini-tripod.

Turning now to FIG. 3, there is shown a camera 68 enclosed within a frame member 10 according to the invention. As will be appreciated from FIG. 3, camera 68 fits snugly within the frame member 10 being in contact with the inner surfaces of bottom member 16 and side walls 18 and 20. The top of the camera 68 is in pressing contact with the inwardly protruding member 44. Thus, all four sides of the frame member 10 enclose the camera and are in good friction fit therewith. Nevertheless, frame member 10 can readily be attached and detached from camera 68, as desired.

In operative combination with camera 68 is an air-operated remote operating 52 means, as earlier disclosed. Such remote operating means are commercially available from a number of photographic graphic supply houses and form no part of my invention, except in combination with the frame member 10.

As shown in FIG. 3, the frame member 10 is connected to a mini-tripod 84 in conventional manner. The end of the elongated threaded member 50 on swivel-head 86 is threadedly connected in the tripod opening 48 (FIG. 1). It is then secured by conventional locking means 88 located on the elongated thread member 50. Mini-tripod 84 is of conventional construction and forms no part of the invention. It is shown merely to illustrate that the frame member 10 allows camera 68 to be used with a tripod even though such was not provided for by the camera manufacture. The tripod 84 comprises an elongated vertically upright body member 90 supported at its bottom by three horizontally extending legs 92, 94, 96. At the top end of body member 90 is provided a cup for the swivel ball 98. This ball is maintained in position by locking means 100, when such is located in the locking position, the ball 98, hence the camera, being able to move when the locking means 100 is in the unlocked, or even partially unlocked position.

Figure 4:
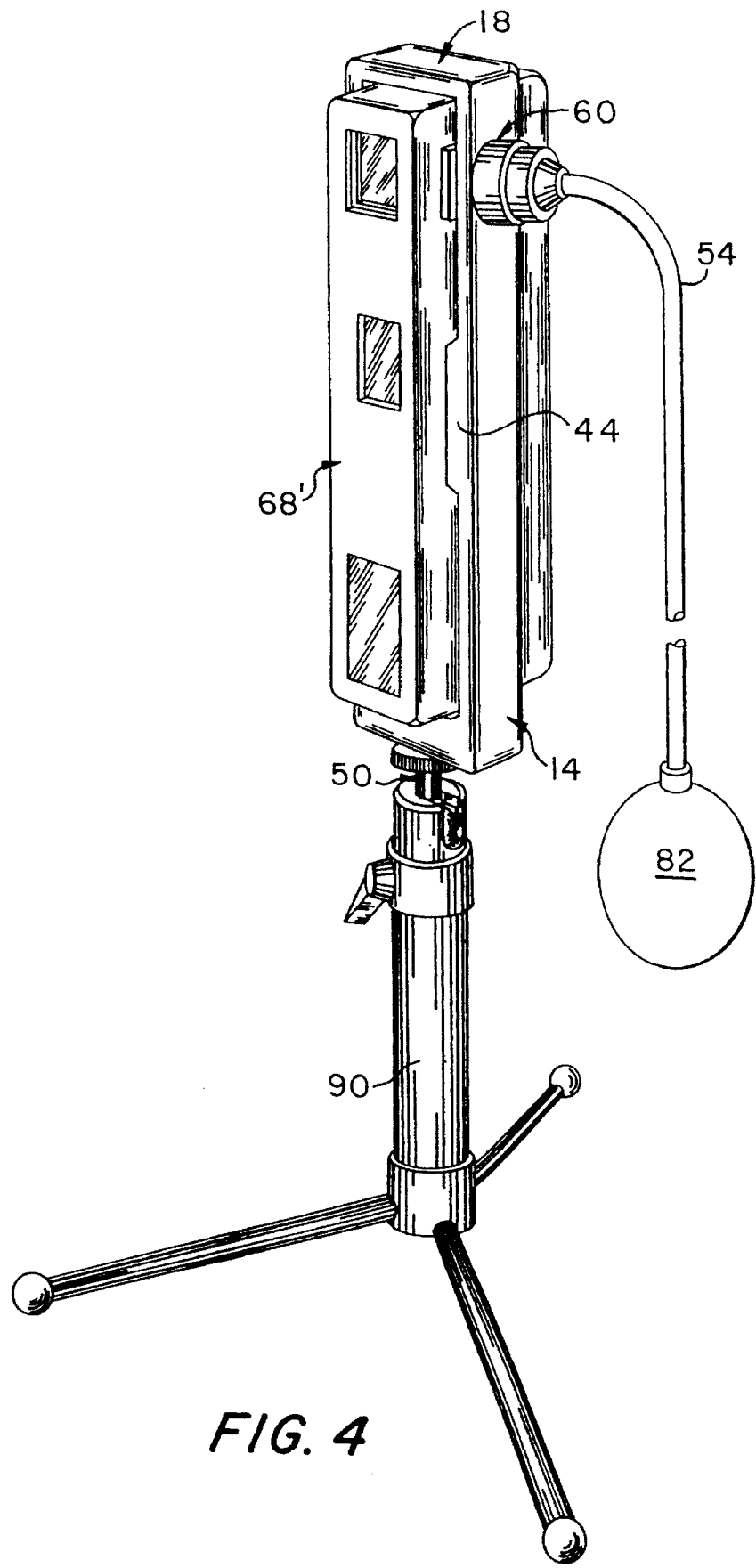
FIG. 4 is a view in perspective showing another version of a camera accessory according to the invention in operative association with a conventional 110 mm camera, the camera being in operative combination with the mini-tripod.

The frame member 10 can be of various sizes and shapes, dependent to a large extent on the camera with which the accessory of the invention will be used. Thus, it can be of rectangular or square shape and of a size to fit a particular camera. In FIG. 4, there is shown a frame member of the invention being used with a camera 68' of a shape different from that shown in FIG. 3.

The frame member 10 can be provided of various materials of construction, as desired, e.g., wood, metal, plastic, and rubber compositions. The frame member is more desirably of a plastic or rubber-like composition. Compositions of these materials can readily be formulated according to well-known techniques to provide any stiffness, hardness, flexibility, softness, or any physical property desired. For example, a frame member of a suitable rubber or plastic composition can be provided having good frictional properties to provide a close fit between the frame member and camera and prevent movement of one relative to the other. Furthermore, such compositions lend themselves to being provided of various colors, as desired. Not only will plastic and rubber compositions provide ease in manufacture but also offer probable certain economies in production. Such frame members can be readily molded by usual techniques, e.g., injection molding, allowing the frame member to be provided of unitary construction. Following molding the internally threaded metal bushings can be fixedly secured to the frame member by various means, e.g., suitable adhesive, depending somewhat upon the particular material of construction.

In addition to those frame members herein described, in some cases it may be desirable to provide a more uniform frame member due to the widely different sizes of cameras. Thus, in this case the frame member can be readily provided of plastic composition but not in a unitary construction. Four members will be provided each having a part of a side wall and a top or bottom member. The legs on each of the members will be provided with an elongated slot and the legs of each of the members will be assembled into a frame member with the legs overlapping one another. A wing nut and threaded bolt can be provided for each of the overlapped members and located within the elongated slots. One need merely adjust the length of the top and bottom members and side walls to the particular camera involved. Afterwards, the wing nuts are tightened to maintain the overlapped members secured in their desired position. Those in the art will readily appreciate that such an adjustable frame member need not, in all cases, have each of the top and bottom members and side members adjustable. With some cameras, only the top and bottom members or the two side walls need be adjustable.

If desired, depending somewhat upon the material of construction of the frame, soft cushioning members or pads can be provided on the bottom member and end walls. Such a pad can also be provided on the planar surface of the downwardly protruding members. Such members can be, for example, of felt or rubber, adhesively secured to the inner surfaces of the frame members. These cushioning materials may offer protection to prevent marring of the camera. Where the frame member is of rubber, such may serve that purpose but also provide good frictional engagement between the camera and inside surfaces of the frame. The cushioning pads can be applied over the entire length of the bottom member and side walls, or over only a part of the length thereof, as desired. Due to the close fitting of the frame member with the camera, these cushioning members may need be taken into consideration in sizing the frame for any particular camera.

The foregoing detailed description has been given for clearness of understanding only and no unnecessary limitations are to be understood therefrom. The invention is not limited to the exact details shown and described for obvious modifications and variations will now occur to those skilled in the art without departing from the spirit and scope of the invention as described in the following claims.

What I claim is:

1. Accessory means adaptable for operative association with a camera for allowing remote operation of the camera's shutter release button comprising a closely fitting frame member for enclosing the camera comprising horizontally disposed top and bottom members parallel to one another each defined by a top and bottom surface and by first and second ends, and by parallel spaced-apart vertically disposed opposing side walls each defined by upper and lower ends and by inner and outer surfaces, said top and bottom members and said side walls being interconnected together at their respective ends and defining the frame member for frictional engagement with respective members of the camera, a vertically disposed opening being provided in said top member of the frame member and extending therethrough, such opening being so located in said top member as to be directly opposed to the shutter release button of the camera at its centrally disposed location when the camera is located in the frame member enclosure.

2. Accessory means according to claim 1 further comprising a circular-shaped, vertically disposed opening in the bottom member, an internal thread pattern being provided on the opening complementary to the external thread pattern provided on the conventional elongated threaded fastening member of a tripod whereby a tripod can be connected to the frame member.

3. Accessory means according to claim 1 further comprising in combination with the frame member means comprising an elongated plunger operatively associated with said frame member at said opening for causing the elongated plunger to operate in reciprocal fashion whereby activation of the camera shutter button can be accomplished by the plunger from a remote location.

4. Accessory means according to claim 3 wherein a predetermined internal thread pattern is provided in the opening and extending the length of the opening.

5. Accessory means according to claim 1 wherein means is fixedly provided in said opening having a predetermined internal thread pattern extending the length of the opening.

6. Accessory means according to claim 4 wherein elongated guide means is located in said opening, said guide means having an external thread pattern complementary to said internal thread pattern and guide means being in threading engagement with said internal thread pattern of said means provided in the opening of the frame member, said elongated guide means being provided with a centrally disposed elongated opening in perpendicular disposition to said top member and providing a passageway for the reciprocating elongated plunger.

7. Accessory means according to claim 3 wherein said means comprising the elongated plunger further comprises means for providing operation of the plunger in reciprocal manner so as to cause the plunger on its forward stroke to be provided in operating contact with the operating button so as to cause it to function in conventional fashion to operate the shutter and then allow the plunger to withdraw in reciprocal manner from contact with the operating button and to be returned to its original position free of contact with the operating button.

8. Accessory means according to claim 7 wherein the means comprising the elongated plunger further comprises an elongated tubular member of predetermined length having an inner end and an outer end and means are provided at the outer end for causing reciprocal operation of the elongated plunger to the extent desired.

9. Accessory means according to claim 8 wherein means are provided at and connected to the inner end of the tubular member comprising an elongated vertically disposed circular-shaped enclosure defined by a top end and a bottom end each of which is provided with an opening, said elongated plunger being of circular-shape and having a top and bottom end, the top end thereof being located in said enclosure, a circular-shaped disc being located at and secured to the top end of the elongated plunger and perpendicularly disposed thereto, said disc being of only slightly less diameter than the circular-shaped enclosure whereby to be able to ride vertically up and down therein while still maintaining an air tight enclosure and connected thereto for providing reciprocal movement of the plunger member.

10. Accessory means according to claim 8 wherein the means providing reciprocal movement of the plunger member comprises a flexible bulb capable of providing a sufficient quantity of air to the enclosure to cause the elongated plunger to be moved downwardly against the operating button causing such to operate and open the camera shutter.

11. Accessory means according to claim 1 wherein the frame member is of a plastic composition and of a unitary construction.

12. Accessory means according to claim 1 wherein an elongated protrusion extends inwardly from the inside surface of the top member at its mid-point defined by a horizontally disposed planar surface whereby to press against the top of the camera, leaving sufficient space between the end of the reciprocating plunger and the operating button of the camera to visually observe the plunger's operation.

13. Accessory means according to claim 1 wherein each of the and bottom members and the side walls comprise two parts which overlap one another and means are provided to maintain each of two parts of the top and bottom members and side walls together whereby the top and bottom members and sides can be extended and held at the desired extension.

14. Accessory according to claim 1 wherein cushion member is provided on at least part of the inside surfaces of the top and bottom members and side walls whereby to provide for better frictional engagement between the frame member surfaces and the enclosed camera.

15. Accessory means according to claim 1 wherein the inside surfaces at least of the top and bottom members are characterized by having good frictional engagement properties with the camera body.

16. Accessory means according to claim 1 wherein the frame members comprise a material providing both good frictional and scratch resistant characteristics with the camera body.

* * * * *